(12) United States Patent
Boubaker

(10) Patent No.: US 12,278,523 B2
(45) Date of Patent: Apr. 15, 2025

(54) ELECTRICAL MACHINE

(71) Applicant: SAFRAN ELECTRICAL & POWER UK LTD., Buckinghamshire (GB)

(72) Inventor: Nadhem Boubaker, Buckinghamshire (GB)

(73) Assignee: SAFRAN ELECTRICAL & POWER UK LTD., Buckinghamshire (GB)

( * ) Notice: Subject to any disclaimer, the term of this patent is extended or adjusted under 35 U.S.C. 154(b) by 207 days.

(21) Appl. No.: 17/913,993

(22) PCT Filed: Apr. 1, 2021

(86) PCT No.: PCT/EP2021/058700
§ 371 (c)(1),
(2) Date: Sep. 23, 2022

(87) PCT Pub. No.: WO2021/204693
PCT Pub. Date: Oct. 14, 2021

(65) Prior Publication Data
US 2023/0126330 A1    Apr. 27, 2023

(30) Foreign Application Priority Data

Apr. 6, 2020 (GB) .................................... 2005018

(51) Int. Cl.
*H02K 11/00* (2016.01)
*H02K 1/16* (2006.01)
(Continued)

(52) U.S. Cl.
CPC .......... *H02K 11/225* (2016.01); *H02K 1/165* (2013.01); *H02K 1/27* (2013.01); *H02K 11/25* (2016.01); *H02K 11/33* (2016.01)

(58) Field of Classification Search
CPC ........ H02K 11/225; H02K 1/165; H02K 1/27; H02K 11/25; H02K 11/33; H02K 1/146;
(Continued)

(56) References Cited

U.S. PATENT DOCUMENTS

2013/0015742 A1* 1/2013 Inoue ..................... H02K 3/28
 310/208
2014/0002001 A1 1/2014 Kinashi
(Continued)

FOREIGN PATENT DOCUMENTS

CN    102694450 A    9/2012
CN    105576929 A    5/2016
(Continued)

OTHER PUBLICATIONS

International Search Report and Written Opinion, International Application No. PCT/EP2021/058700, dated Jun. 17, 2021, 14 pages.
(Continued)

*Primary Examiner* — Thomas Truong
(74) *Attorney, Agent, or Firm* — RANKIN, HILL & CLARK LLP

(57) ABSTRACT

An electrical machine for use in an aircraft. The electrical machine includes a rotor that includes a plurality of rotor poles, and a stator including a plurality of phases. Each respective phase occupies at least one elementary block. The at least one elementary block of each phase includes a set of conductors of the respective phase wound around a plurality of slots of the respective elementary block in a concentrated winding configuration. The stator further includes at least one sensor located between two elementary block. The at least one sensor being configured to measure at least one parameter of the rotor.

19 Claims, 17 Drawing Sheets

(51) Int. Cl.
   *H02K 1/27*    (2022.01)
   *H02K 11/225*  (2016.01)
   *H02K 11/25*   (2016.01)
   *H02K 11/33*   (2016.01)

(58) Field of Classification Search
   CPC ...... H02K 21/16; H02K 2213/03; H02K 3/28; H02K 11/20; H02K 19/12
   See application file for complete search history.

(56) References Cited

U.S. PATENT DOCUMENTS

| | | | |
   |---|---|---|---|
   | 2014/0009166 A1 | 4/2014 | Neumann | |
   | 2015/0097454 A1* | 4/2015 | Schmid | B67C 3/22 |
   | | | | 310/68 B |
   | 2015/0115757 A1* | 4/2015 | Reddy | H02K 1/246 |
   | | | | 310/156.01 |
   | 2018/0026502 A1 | 1/2018 | Kawasaki et al. | |
   | 2018/0294696 A1 | 10/2018 | Brabetz et al. | |
   | 2020/0028409 A1* | 1/2020 | Jastrzebski | H02K 17/20 |

FOREIGN PATENT DOCUMENTS

| | | |
   |---|---|---|
   | DE | 60003275 T2 | 4/2004 |
   | DE | 102018211089 A1 | 1/2020 |
   | EP | 1615318 A2 | 1/2006 |
   | JP | 2010011637 A | 1/2010 |
   | JP | 2011254628 | 12/2011 |
   | WO | 95/28031 A1 | 10/1995 |
   | WO | 2015/040305 A3 | 3/2015 |
   | WO | 2019/012915 A1 | 1/2019 |

OTHER PUBLICATIONS

Great Britain Search Report, Application No. GB2005018.3, dated Aug. 11, 2020, 3 pages.
   1 European Examination Report for 21716718.8-1202 dated Feb. 6, 2024, 6 pages.
   UK Examination Report for GB2005018.3, dated Jul. 12, 2024, 4 pages.

* cited by examiner

ELECTRICAL MACHINE

The present invention relates to an electrical machine for use in an aircraft. In particular, the present invention relates to an electrical machine with an integrated sensor for detecting parameters of the rotor, such as position and temperature.

BACKGROUND TO THE INVENTION

Electric aircraft propulsion systems typically comprise a fan (propeller), which is connected to an electrical machine. The electrical machine is typically formed of an assembly of magnetic circuit components, comprising a rotor and a stator. As is well known, rotation of the rotor relative to the stator causes interaction of the magnetic field generated by the rotor with windings provided on the stator, generating an induced electromotive force (EMF) and/or electrical current. In a permanent magnet generator, the rotor's magnetic field is produced by permanent magnets, which induces an AC voltage in the stator windings as the stator windings pass through the moving magnetic field of the permanent magnet.

In order to control the machine so as to synchronise the armature AC excitation with the rotational speed (i.e. the back EMF), and thus subsequently obtain the torque, the rotor position must be known. Typically, the rotor position is measured using a resolver or Hall Effect sensor that is integrated in the rotor and rotates with it. However, a shaft mounted sensor such as those typically used can be very costly, particularly if high accuracy is required, can be unreliable and have low fault tolerance, are usually very bulky and can add to the overall weight of the machine since a bigger shaft is required to accommodate the sensor. To overcome the problems of a sensor integrated with the rotor, "sensorless control laws", also known as observers and estimators, are implemented. This technique monitors the rotor position by only measuring the electrical waveforms (voltages and currents) of the stator windings via the power electronics. However, this method is not particularly robust at low speeds and/or low loads since there is very little back EMF and/or currents being generated, and is not always found to be accurate.

Therefore, there is a need to improve the way in which the rotor position is monitored in an electrical machine.

SUMMARY OF THE INVENTION

A first aspect of the invention provides an electrical machine for use in an aircraft, comprising a rotor, wherein the rotor comprises a plurality of rotor poles, and a stator comprising a plurality of phases, wherein each respective phase occupies at least one elementary block, the at least one elementary block of each phase comprising a set of conductors of the respective phase wound around a plurality of slots of the respective elementary block in a concentrated winding configuration, wherein the stator further comprises at least one sensor located between two elementary blocks, the at least one sensor being configured to measure at least one parameter of the rotor.

As such, the concentrated windings for each phase of the stator are grouped together in at least one block, with at least one sensor for measuring parameters of the rotor being integrated in the stator between two of these blocks. Arranging the sensor in this way removes the need to provide a sensor on the rotating armature of the rotor itself, and contributes to reducing the overall weight and cost of the electrical machine.

The at least one sensor may be configured to measure an angular position of the rotor. The at least one sensor may also be configured to measure a temperature of the rotor.

The at least one sensor may comprise at least one sensor coil wound around a pair of adjacent slots. As such, the stator is provided with at least two additional slots dedicated solely to the sensor coil. By arranging the sensor coil in a separate set of slots, this stops the phase windings from disrupting the performance of the sensor coil. Typically, the sensor coil pitch, that is, the angle between the two slots of the sensor, will be less than the angle between adjacent poles of the rotor in order to get the required sinusoidal waveform.

The electrical machine may further comprise at least one power electronics module for treating the electrical output of the concentrated windings, wherein the at least one power electronics module is electrically connected to the conductors of at least one phase of the plurality of phases, and wherein the at least one sensor coil is electrically connected to a power electronics module of the electrical machine. That is to say, the sensor coil can be connected to one of the power electronics modules used to treat the output of the windings. In this respect, each phase may have its own separate power electronics module, or multiple phases may be connected to the same power electronics module. The power electronics modules of each stator module may be configured to convert DC power to AC power. For example, the power electronics modules may include an inverter.

The at least one sensor coil may be arranged to measure an angular position of the rotor based on the voltage induced therein. That is to say, the voltage measured at the terminals of the sensor coil is indicative of the rotor position. In this respect, the voltage induced at the coil is dependent on the mechanical position of the sensor coil with respect to the phase windings (i.e. the mechanical angle between the sensor slots and the slots of the adjacent phase windings), the total number of stator slots and rotor poles, the number of elementary blocks and the rotor position. Since all of the other variables are fixed and known, the variations in induced voltage can be used to determine the angular position of the rotor as it rotates.

The at least one sensor coil may also be arranged to measure a temperature of the rotor based on the voltage induced therein. In this respect, changes in the back EMF induced in the sensor coil are indicative of changes in the temperature of the rotor magnet.

A first mechanical shift angle between the sensor coil and an adjacent elementary block may be greater than the rotor pole pitch, the rotor pole pitch being an angle between adjacent poles of the rotor. This helps to ensure that the sensor coil does not interfere with the performance of the phase windings.

A second mechanical shift angle between the respective concentrated windings of each pair of adjacent elementary blocks may be less than the rotor pole pitch. That is to say, the elementary blocks are mechanically shifted together so that they are separated by a small stator tooth in order to make enough space for the sensor, whilst still retaining the required electrical shift between phases. At the same time, the stator slot pitch may be equal to the rotor pole pitch in order to maximise the flux linkage between the rotor poles and the coils of each phase, thereby providing a unit winding factor, which results in a more efficient machine.

The second mechanical shift angle may be about two thirds of the rotor pole pitch. This ensures that the mandatory electric shift between phases is maintained, which for a three-phase machine is 120°.

The stator may comprises two sensors. Such an arrangement provides redundancy and fault tolerance in that if one sensor fails, the operation of the second sensor is not affected. This is important where the sensor is being used for monitoring the position of the rotor for use in controlling the machine.

In some cases, each of the two sensors comprises a sensor coil wound around a pair of adjacent slots.

The two sensors may comprise a first sensor at a first position on the stator and a second sensor at a second position on the stator. For example, the first and second positions are diametrically opposed. Alternatively, the first position may be adjacent to the second position.

The two sensors may comprise a first sensor coil and a second sensor coil, the first and second sensor coils being wound around a mutual pair of adjacent slots. That is to say, the two sensor coils are wound around the same pair of slots.

The rotor may comprise a plurality of permanent magnets.

Each phase may comprise two elementary blocks being connected by a single end conductor. In such cases, each phase may be divided into two diametrically opposing zones, which act to balance the forces of the rotor and thereby reduce the amount of vibration and noise. Furthermore, the two elementary blocks of each phase may be configured to provide separate power channels that act independently of one another, which is useful for achieving fault tolerant conditions where one channel is able to continue operating at full power if the other power channel fails. In such cases, the stator may comprise two diametrically opposed sensors, each corresponding to one power channel. This is also important for redundancy and fault tolerance in that if one sensor fails, the operation of the second sensor is not affected.

In some arrangements, the stator may comprise three phases.

A further aspect of the present invention provides an aircraft propulsion system comprising an electrical machine according to any of the preceding claims.

BRIEF DESCRIPTION OF THE DRAWINGS

Further features and advantages of the present invention will become apparent from the following description of embodiments thereof, presented by way of example only, and by reference to the drawings, wherein.

DETAILED DESCRIPTION OF PREFERRED EMBODIMENTS

Figure 1:
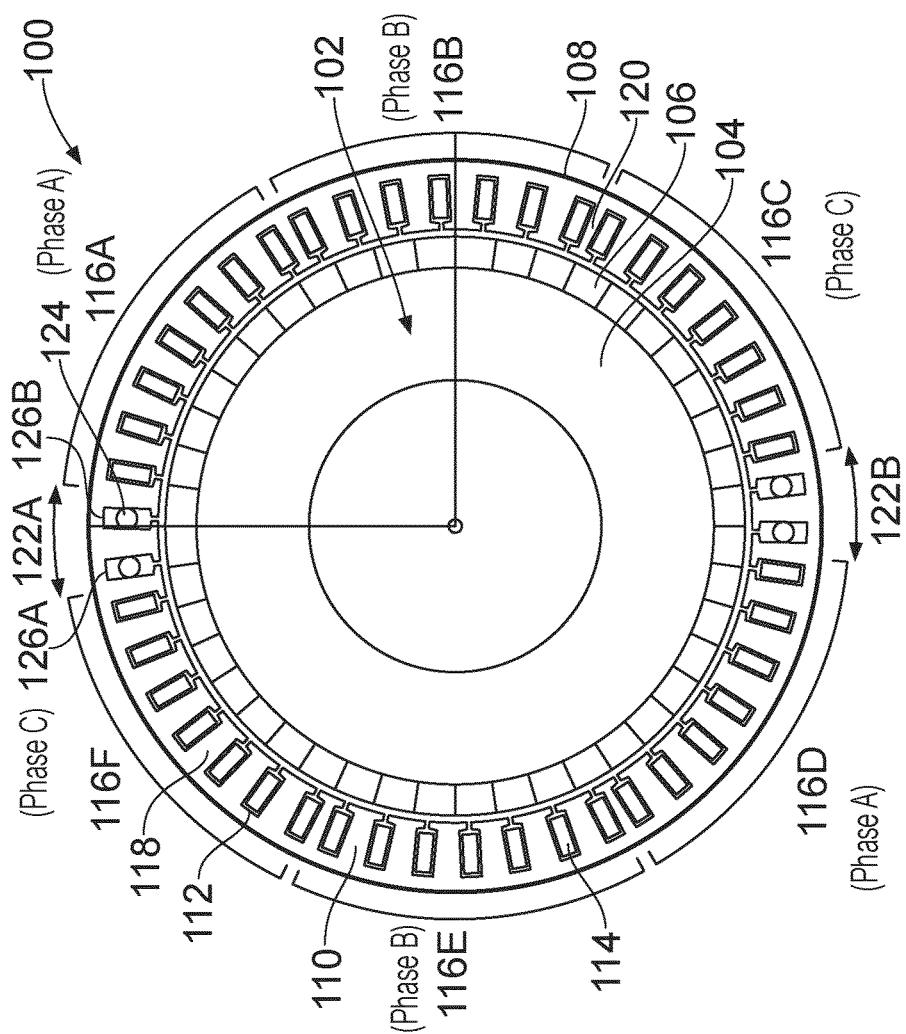
FIG. 1 is a diagram illustrating an electrical machine according to the present invention.

FIG. 1 illustrates a three phase electrical machine 100 according to the present invention, comprising a rotor 102 and a stator 108. The rotor 102 comprises a rotating component 104, preferably in the form of a ferromagnetic back iron, the rotating component 104 being surrounded by an array of permanent magnets 106 distributed around its circumference. The number of poles that the electrical machine 100 has is equal to the number of permanent magnets 106 on the rotor 102. The peripheral distance between the centres of two adjacent poles, that is, the angle between two adjacent rotor magnets 106, is referred to as the rotor pole pitch.

Specifically, the rotor pole pitch, $\tau_p$, is calculated by:

$$\tau_p = \frac{360}{2p} \qquad [1]$$

Where:

2p is the total number of poles in the rotor.

Here, it will be appreciated that p refers to the number of pole pairs. In the example shown in FIG. 1, the rotor 102 comprises 44 permanent magnets 106, that is to say, the total number of poles is 44.

The stator 108 comprises a magnetic stator core 110, and plurality of longitudinal slots 112 distributed evenly around the circumference of the stator 108 and that extend through the stator core 110 in the direction of the longitudinal axis. In the example shown in FIG. 1, the stator 108 comprises 42 slots 112. The stator 108 further comprises a plurality of concentrated windings for each of the three phases (denoted A, B and C). For each phase, the windings are grouped such that a plurality of conductors 114 are wound around the slots 112 to form two elementary blocks 116A-116F of concentrated windings, with each slot 112 being configured to receive a coil of conductors 114 comprising at least one conductor 114 in each slot 112, known as a single layer winding. However, it will be appreciated by the skilled person that the same concept may be extended to a double layer winding arrangement, in which the slots of the stator are configured to receive two coils of conductors 114. In this example, the conductors 114 for phase A are wound around the slots 112 in the blocks denoted 116A and 116D, the conductors 114 for phase B are wound around the slots 112 in the blocks denoted 116B and 116E, and the conductors 114 for phase C are wound around the slots 112 in the blocks denoted 116C and 116F. As such, in this example, each phase has been divided into two diametrically opposing zones, which in turn has the effect of balancing the forces of the rotor 102, thereby reducing the amount of vibration and noise. Similarly, the two distinct zones of each phase may be used to provide separate power channels that act independently of one another. This is important for redundancy and achieving fault tolerant conditions whereby one power channel is able to continue operating at full power if the other power channel fails.

Figure 2:
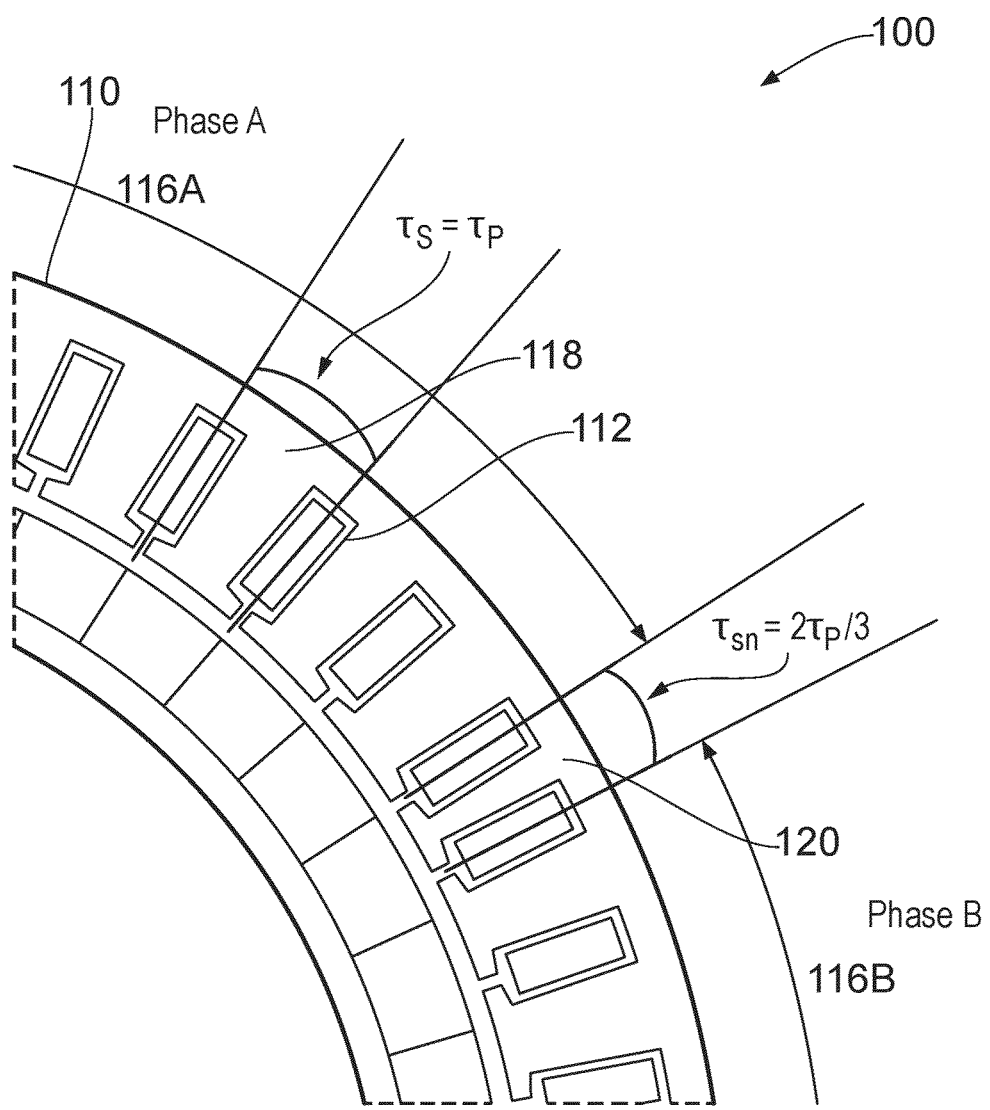
FIG. 2 is a further diagram illustrating an electrical machine according to the present invention.

Within each elementary block 116A-116F, the slots 112 are separated by a plurality of stator teeth 118 of a first size, such that the slot pitch, $\tau_s$, that is, the angle between adjacent slots 112, is equal to the rotor pole pitch, $\tau_p$, as illustrated in FIG. 2. This helps to ensure that the whole of the flux generated from the rotor 102 is linking with the coils formed by the windings in the stator 108, that is to say, the flux linkage is maximized, and consequently the winding factor is equal to one. This perfect alignment is impossible to obtain with the conventional concentrated winding, and consequently the winding factor will always be less than one.

The elementary blocks of the winding, 116A-116F, are mechanically shifted together so that at least a portion of the elementary blocks 116A-116F are separated by a small stator tooth 120 of a second size. As such, the slot pitch between the end slots 112 of a portion of the adjacent elementary blocks 116A-116F, $\tau_{sn}$, is equal to two thirds of the rotor pole pitch, $\tau_p$, which ensures that the mandatory electric shift between phases is maintained, which in the case of a three phase machine is 120°. In the example of FIGS. 1 and 2, elementary blocks 116A-116C are mechanically shifted together such that there is a small stator tooth 120 between blocks 116A and 116B and a small stator tooth 120 between blocks 116B and 116C. Similarly, elementary blocks 116D-116F are mechanically shifted together such that there is a small stator tooth 120 between blocks 116D and 116E and a small stator tooth 120 between blocks 116E and 116F.

By arranging the elementary blocks 116A-116F in this way, two spaces are created within the stator core 110 in which static position sensors 122A-122B are installed. However, it will be appreciated by skilled person that the elementary blocks may be arranged in such a way that a space for only one position sensor is provided, as will be described in later examples. In this example, each position sensor 122A-122B comprises a sensor coil 124 wound around a pair of slots 126A-B. It will be appreciated by the skilled person that the slots 126A-B in which the sensor coils 124 are located could have the same, similar or different shape and size (e.g. height and width) as the slots of 112 of the main phase windings. The first position sensor 122A is located between elementary blocks 116A (Phase A) and 116F (Phase C), and the second position sensor 122B is located between elementary blocks 116C (Phase A) and 116D (Phase C).

Arranging the electrical machine 100 in this way so that one or more sensors 122A, 122B are integrated to the stator core 110 removes the need to provide a sensor on the rotating armature of the rotor 108 itself, and contributes to reducing the overall weight and cost of the electrical machine 100.

Figure 5:
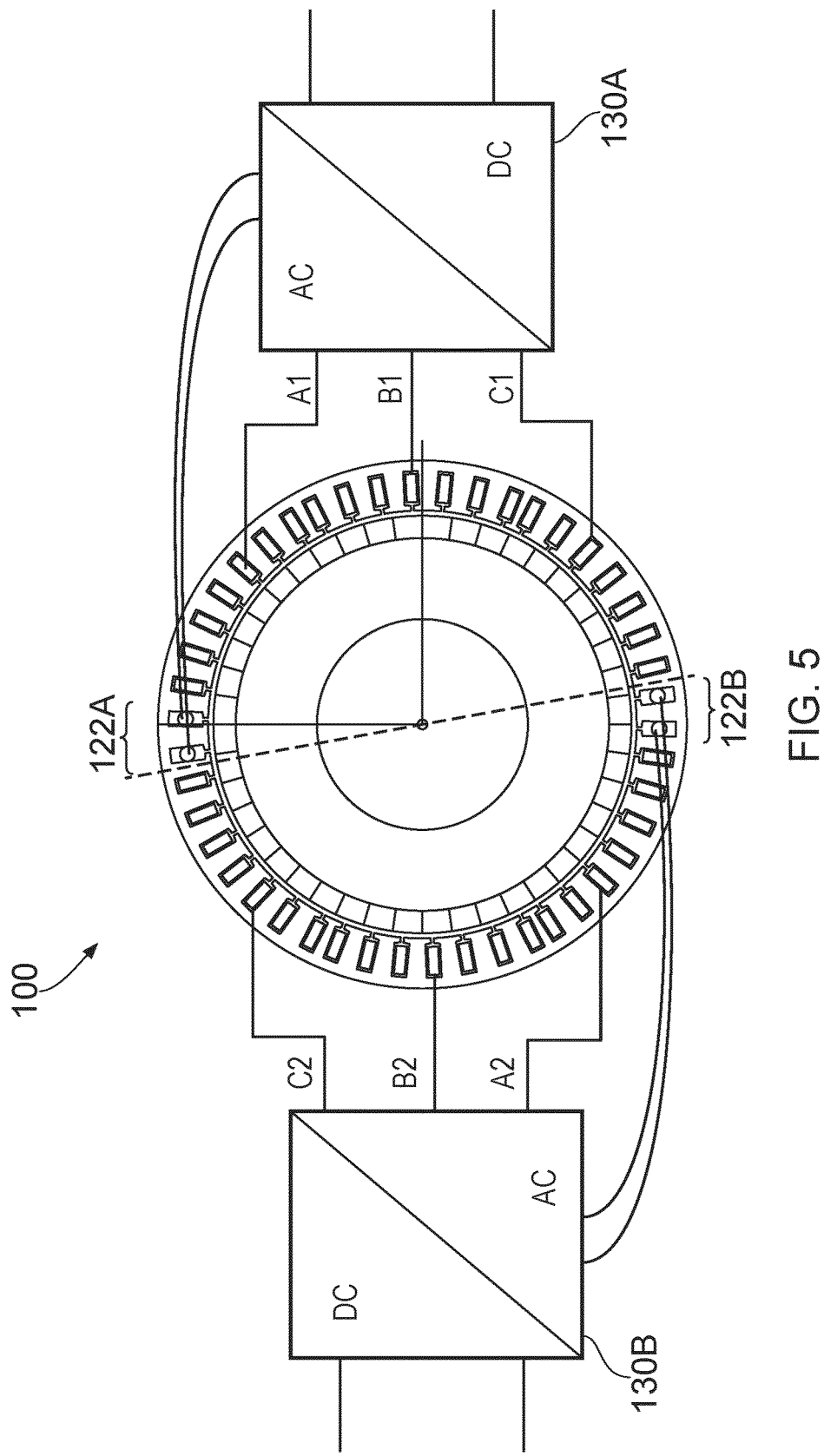
FIG. 5 is further diagram illustrating an electrical machine according to the present invention.

As illustrated by FIG. 5, these position sensors 122A, 122B can then be connected to the power electronics 130A-130B of the electrical machine 100 and used for monitoring both the position and temperature of the rotor 102 based on the voltage induced at their terminals, as will be described in more detail below. In the example shown in FIG. 5, each position sensor 122A, 122B is connected to the same power electronics modules 130A, 130B, such as an inverter, used for converting the DC current to AC current of the main phase windings. In this example, the first position sensor 122A is connected to a first inverter 130A, which is connected to a first set of windings for each phase (denoted phases A1, B1 and C1). This corresponds to one power channel. The second position sensor 122B is connected to a second inverter 130B, which is connected to a second set of windings for each phase (denoted phases A2, B2 and C2). This corresponds to a second power channel. As such, each inverter 130A, 130B has a dedicated position sensor 122A, 122B, which is important for redundancy and fault tolerance. In this respect, if one position sensor fails, the operation of the second sensor is not affected, and thus control of the machine can be maintained. In particular, electric machines with six elementary blocks (n=6) and two position sensors diametrically opposed, such as the present example, provide a balanced radial magnetic pull that is required to improve the noise and vibrational behaviour of the machine. Moreover, as the sensor coil 124 is wound around its own slots 126A-B, its performance is not interfered with or disturbed by the main phase windings.

Whilst two sets of power electronics modules 130A, 130B are shown in the above example, it will of course be appreciated that any suitable number may be used. For example, each elementary block of windings may be connected to separate power electronics.

Figure 3:
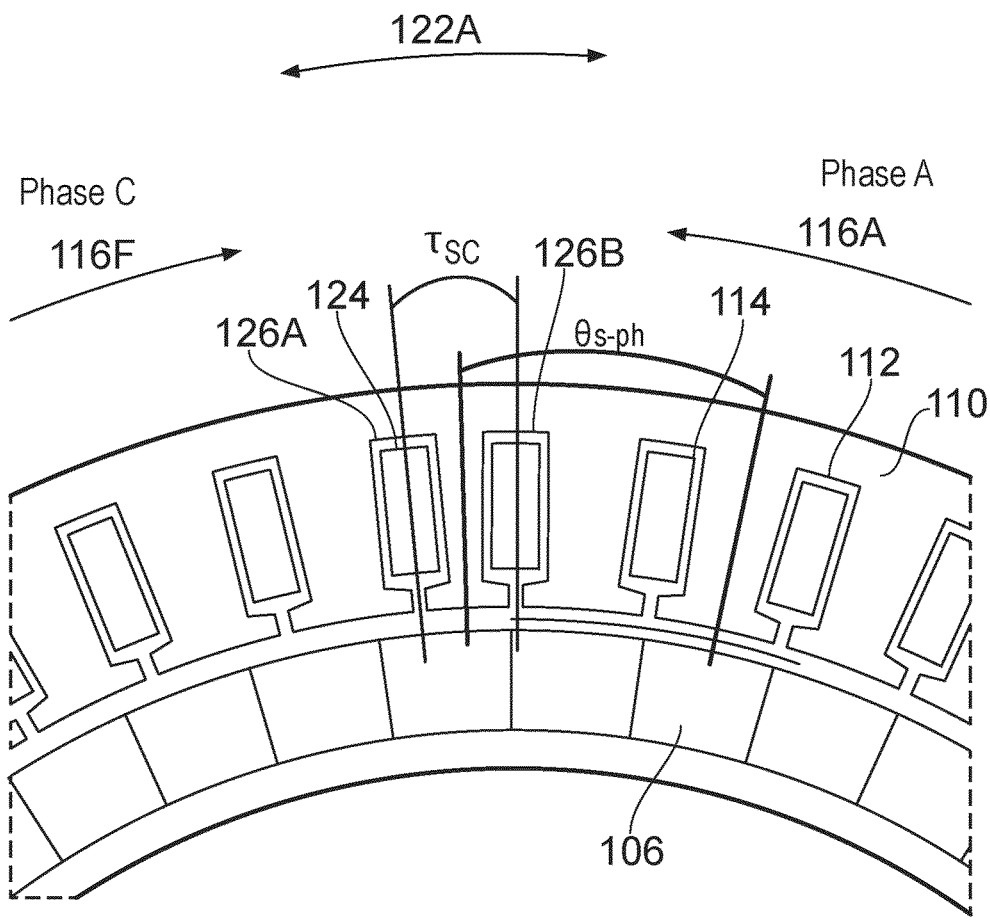
FIG. 3 is a diagram illustrating part of an electrical machine according to the present invention.
Figure 4:
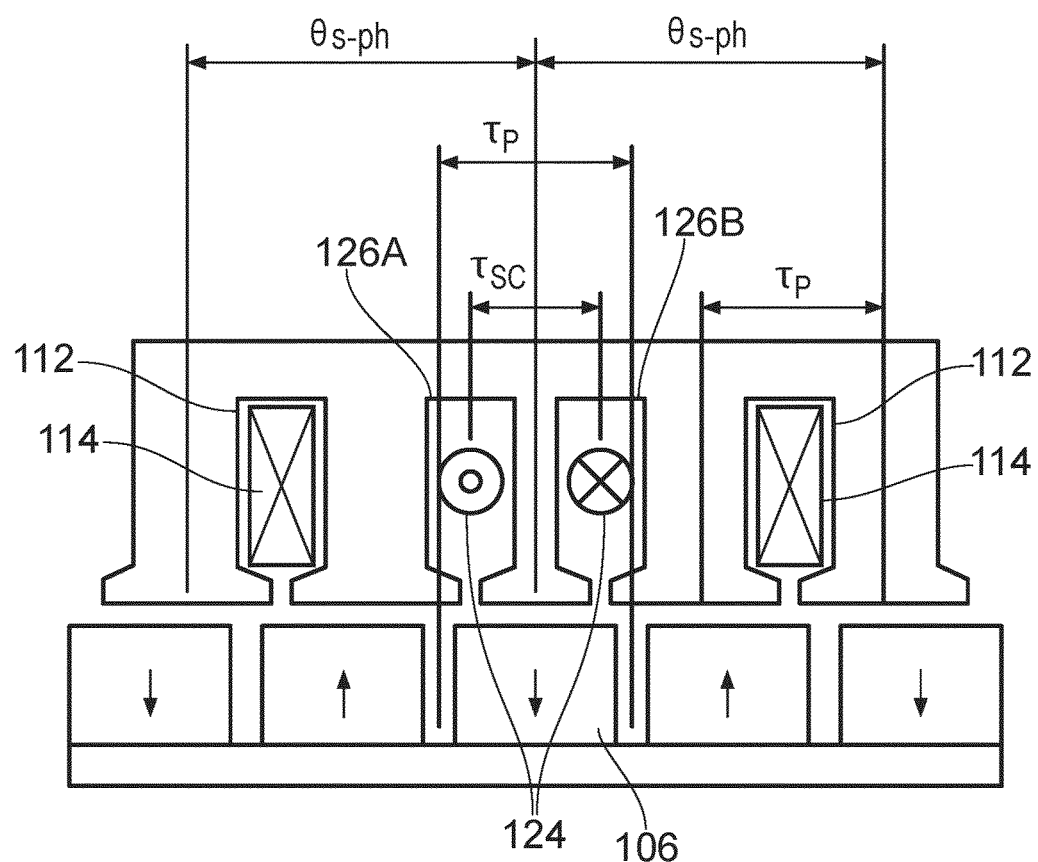
FIG. 4 is a further diagram illustrating part of an electrical machine according to the present invention.

The sensor coil 124 is designed to obtain the required amplitude and waveform quality of the voltage induced at its terminals. In this respect, the main characteristics of the sensor coil 124 are the number of turns, $N_t$, and the sensor coil pitch, $\tau_{sc}$, as illustrated by FIGS. 3 and 4. In the case of two sensors such as the present example, it will be appreciated that the sensor coils 124 may different characteristics. For example, two sensor coils 124 may be provided, each with a different number of turns to provide two different voltages, one with a high voltage and one with a low voltage. One benefit being able to adapt the characteristics of the sensor coils may be that a sensor coil, for example, one with a higher voltage, could be used to supply a small amount of electrical power to the power electronics at the same time as providing its sensing function.

By knowing the mechanical position of the sensor coil 124 with respect to the magnetic axis of the adjacent phase winding, that is, the angle, $\theta_{s\text{-}ph}$, between the sensor coil 124 and the adjacent slots 112 of the main phase windings 116A and 116F, as shown in FIGS. 3 and 4, and the voltage at the terminals of the sensor coil 124, it is possible to accurately determine the position of the rotor.

In this respect, the relationship between the rotor position, $\theta_r$, and the voltage induced in the sensor coil 124, $V_{coil}$, can be calculated by the following equations:

$$V_{coil} = V_{pk} \sin\left(2\pi f t - \pi\left(\frac{N_s}{n} - 2 + p\frac{\theta_{s\text{-}ph}}{180}\right)\right) \quad [2]$$

$$V_{coil} = V_{pk} \sin\left(\theta_r - \pi\left(\frac{N_s}{n} - 2 + p\frac{\theta_{s\text{-}ph}}{180}\right)\right) \quad [3]$$

where:
$V_{pk}$ is the amplitude of the voltage induced;
f is the electrical frequency;
p is the number of pair poles;
$N_s$ is the number of stator slots containing phase windings;
n is the number of elementary blocks; and
t is the time.

The amplitude of the voltage induced at the terminals of the sensor coil 124 can be further calculated as:

$$V_{pk} = 2\pi f k_W N_{tr} \phi_{pk} = \pi \frac{p\Omega}{30} k_W N_{tr} \phi_{pk} \qquad [4]$$

where:
$\Omega$ is the rotor speed;
$N_{tr}$ is the number of turns of the sensor coil;
$\Phi_{pk}$ is the peak of the fundamental of the flux linkage seen by one turn; and
$k_w$ is the winding factor.
The winding factor, $k_w$, can be further defined as:

$$k_W = \sin\left(\frac{\tau_{sc-p}\pi}{2}\right) \qquad [5]$$

Where $\tau_{sc-p}$ is the sensor coil pitch per unit, also referred to as coil span per unit, defined as:

$$\tau_{sc-p} = \frac{\tau_{sc}}{\tau_p} \qquad [6]$$

Figure 6:
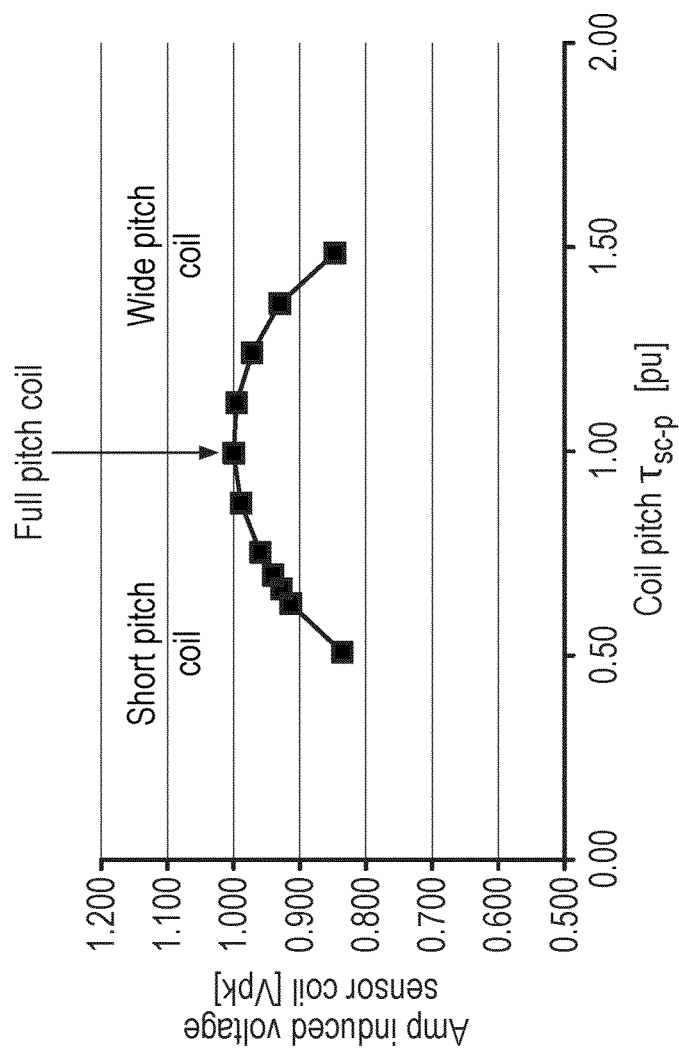
FIG. 6 is a graph illustrating an output of an electrical machine according to the present invention.
Figure 7:
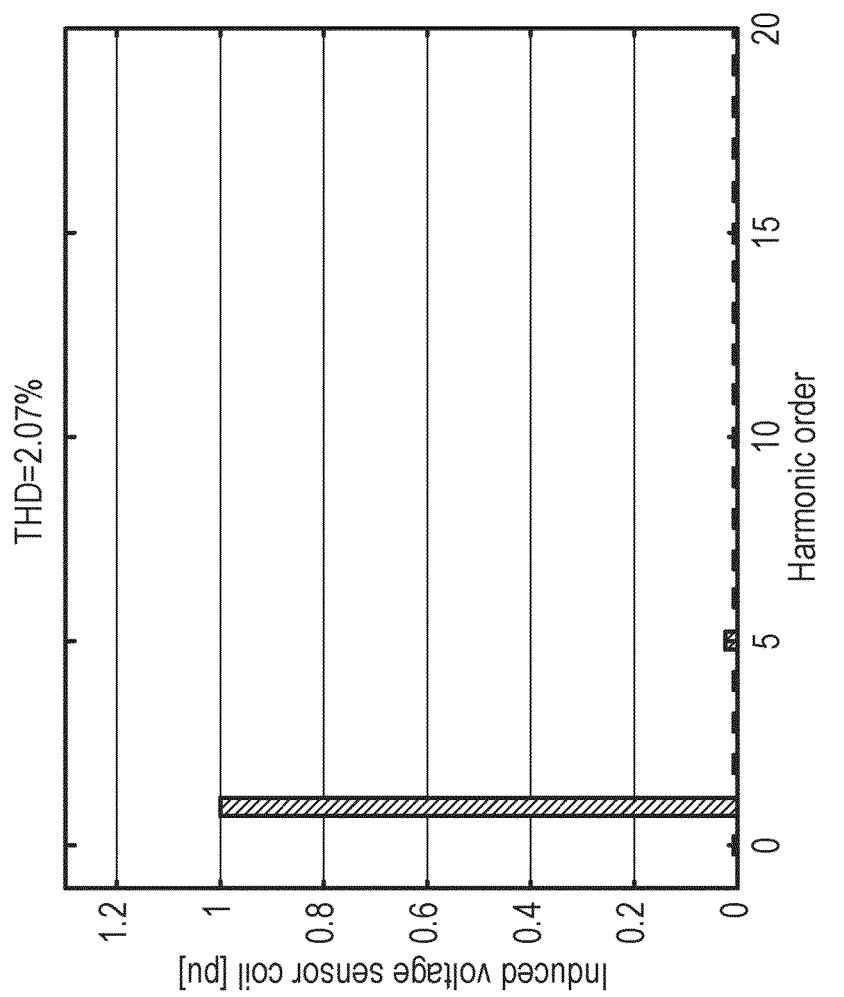
FIG. 7 is a further graph illustrating an output of an electrical machine according to the present invention.

According to equations [4]-[6], the amplitude of the induced voltage is closely linked to the coil pitch, $\tau_{sc-p}$, as illustrated by FIG. 6. Likewise, the harmonic content of the voltage waveform is closely dependent on the coil span, and thus any particular harmonic can be eliminated or highly mitigated by selecting a particular $\tau_{sc-p}$. In this respect, it is generally easier to monitor a pure sinusoidal waveform with only one fundamental harmonic, and thus it is advantageous that the properties of the sensor coil 124 may be adjusted to obtain the preferred waveform. For example, as illustrated in FIG. 7, a $\tau_{sc-p}$ equal to ⅔ pu eliminates the 3$^{rd}$ harmonic.

Figure 8:
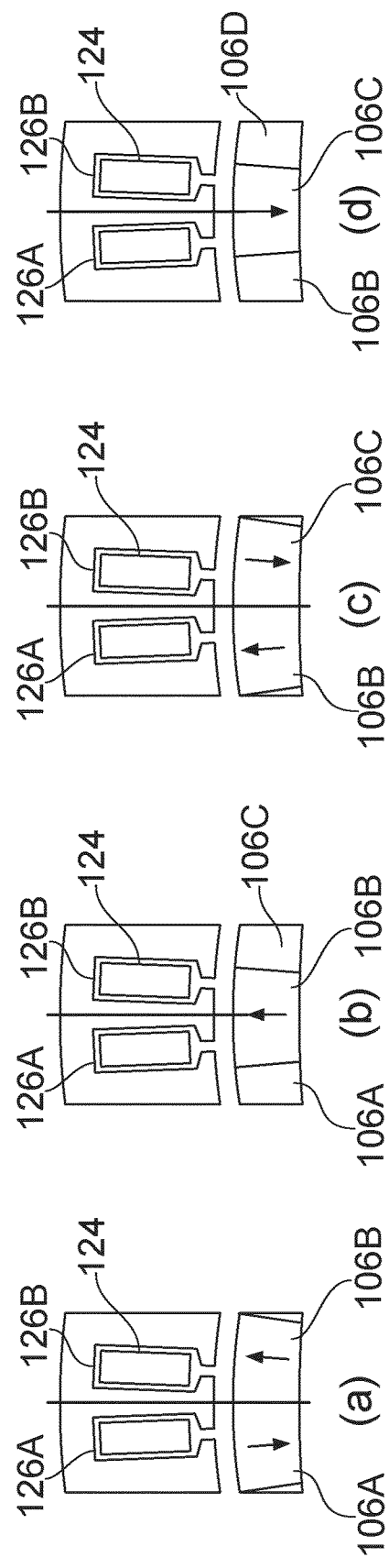
FIG. 8 is a further graph illustrating an output of an electrical machine according to the present invention.
Figure 8:
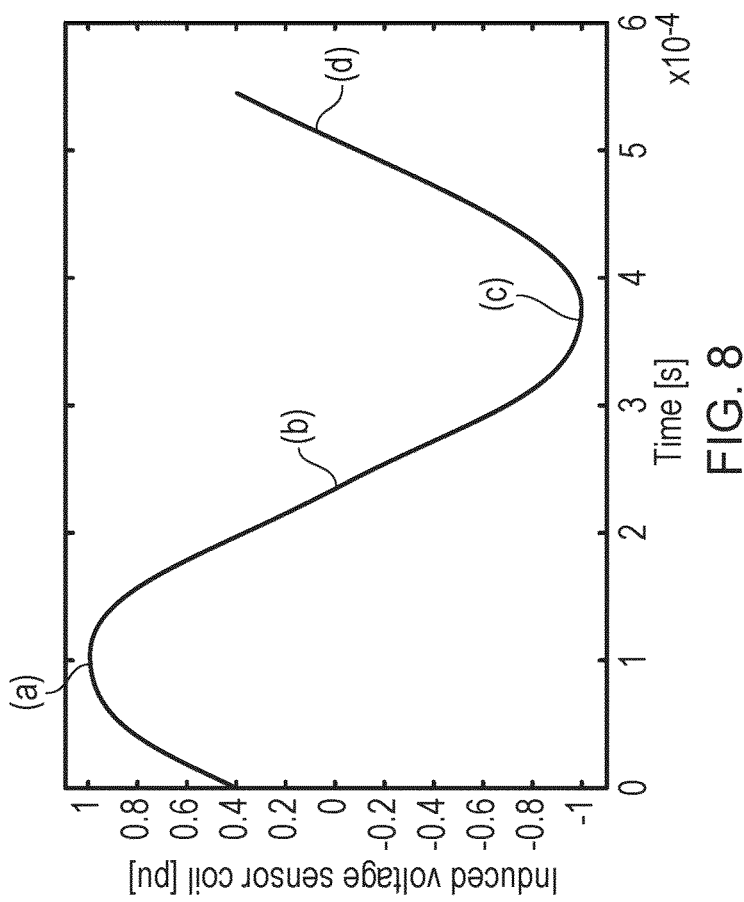

As illustrated by FIG. 8, the voltage induced in the sensor coil 124 as the rotor magnets 106 rotate can be used to accurately determine the position of the rotor 102. As defined in equations [2] of [4], the voltage waveform is indicative of the rotational speed and position of the rotor 102. Given the time, the number of rotor pole pairs, the number of slots in stator and the position of the sensor relative to the main phase windings, the position of the rotor 102 within the stator 104 can be determined. For example, at a first position (a) at t=1 s, two rotor magnets 106A and 106B are positioned directly under sensor slots 126A and 126B respectively, such that an induced voltage of 1 pu is output. As the rotor magnets 106 rotate to a second position (b) such that one rotor magnet 106B is positioned directly in line with the sensor coil 124, the induced voltage decreases to 0 pu. As the rotor magnets 106 continue to rotate to a third position (c) and then a fourth position (d), the induced voltage continues to oscillate correspondingly, which can thus be mapped to a particular rotor position.

Figure 9:
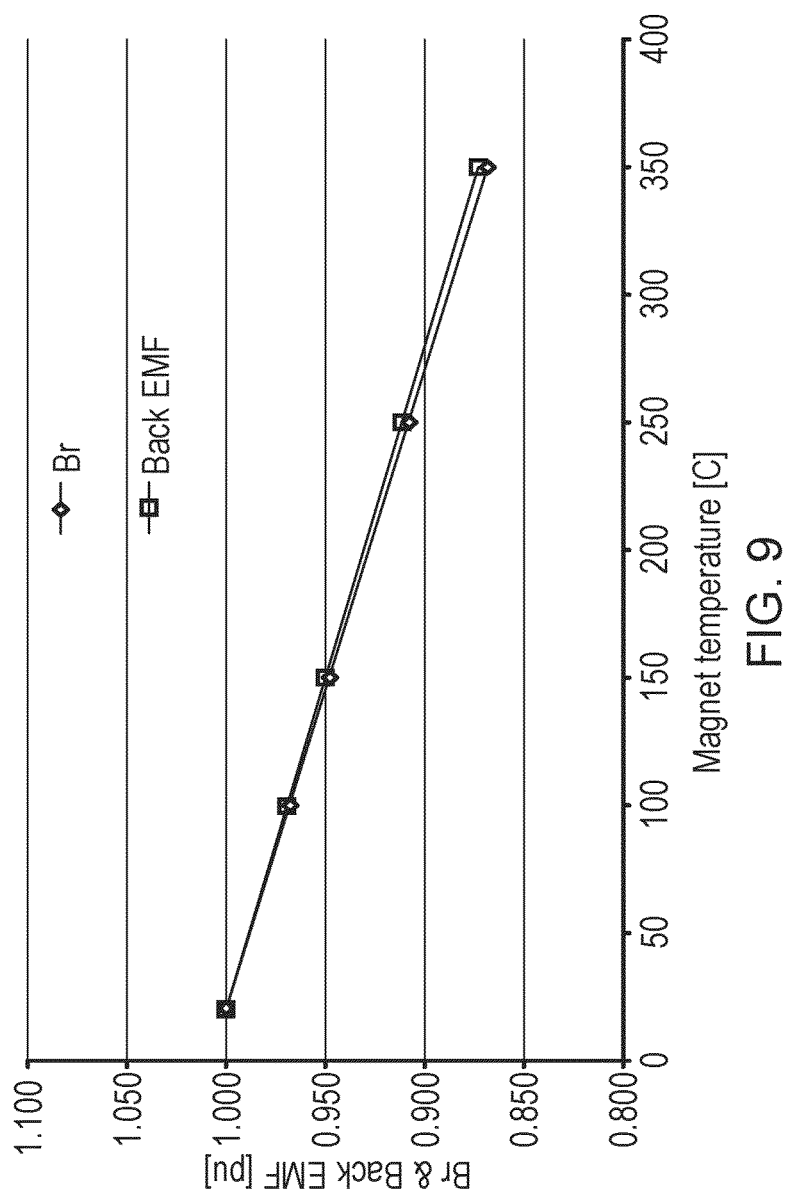
FIG. 9 is graph illustrating a further output of an electrical machine according to the present invention.

In addition to the rotor position, the voltage measured at the terminals of the sensor coils 124 can also be used to indicate the temperature of the rotor magnet. As described by equation [4] above, the amplitude of the induced voltage in the sensor coil 124 is proportional to the rotational speed and the linkage flux generated by the rotor magnets 106. This linkage flux is closely linked to the residual flux density of the array of permanent magnets 106, Br, which is closely dependent on the operating temperature of the rotor 102. The higher the magnet temperature, the lower the magnet residual induction, Br, and the lower the induced voltage in the sensor coil, as illustrated by FIG. 9. As such, by measuring the drop in back EMF at the terminals of the sensor coil 124, the drop in residual induction Br can be determined, from which the temperature of the rotor magnet can be determined.

In this respect, the temperature dependence of the residual induction of the magnet is defined by:

$$B_r(T) = B_{r20° C.}(1 + \alpha(T - 20° C.)) \qquad [7]$$

where:
$\alpha = \approx -0.04\%/K$ for SmCo
$\alpha = \approx -12\%/K$ for NdFeB Here, SmCo and NdFeB are the two common rare-earth alloy magnets that are used in permanent magnet electrical machines. However, it will be appreciated that any suitable magnetic material may be used, and that an appropriate $\alpha$ value may be used in each case to determine the temperature from the residual induction.

To obtain a feasible electrical machine having at least one position sensor integrated to the stator core, the number of slots $N_s$ and the number of poles 2p must satisfy a set of conditions.

For an electrical machine having three elementary blocks of phase windings, n=3:

if $N_s$ is even: $N_s = 2p - i$ where i=0, 2, 4, . . .

if $N_s$ is odd: $N_s = 2p - i$ where i=1, 3, 5, . . .

For an electrical machine having six elementary blocks of phase windings, n=6:

$N_s = 2p - i$ where i=0, 2, 4, . . .

Preferably, the space allocated to the position sensor is minimised so as to have the number of slots $N_s$ being as close as possible to the number of poles 2p.

Several examples of feasible electrical machines according to the above will now be described.

Figure 10:
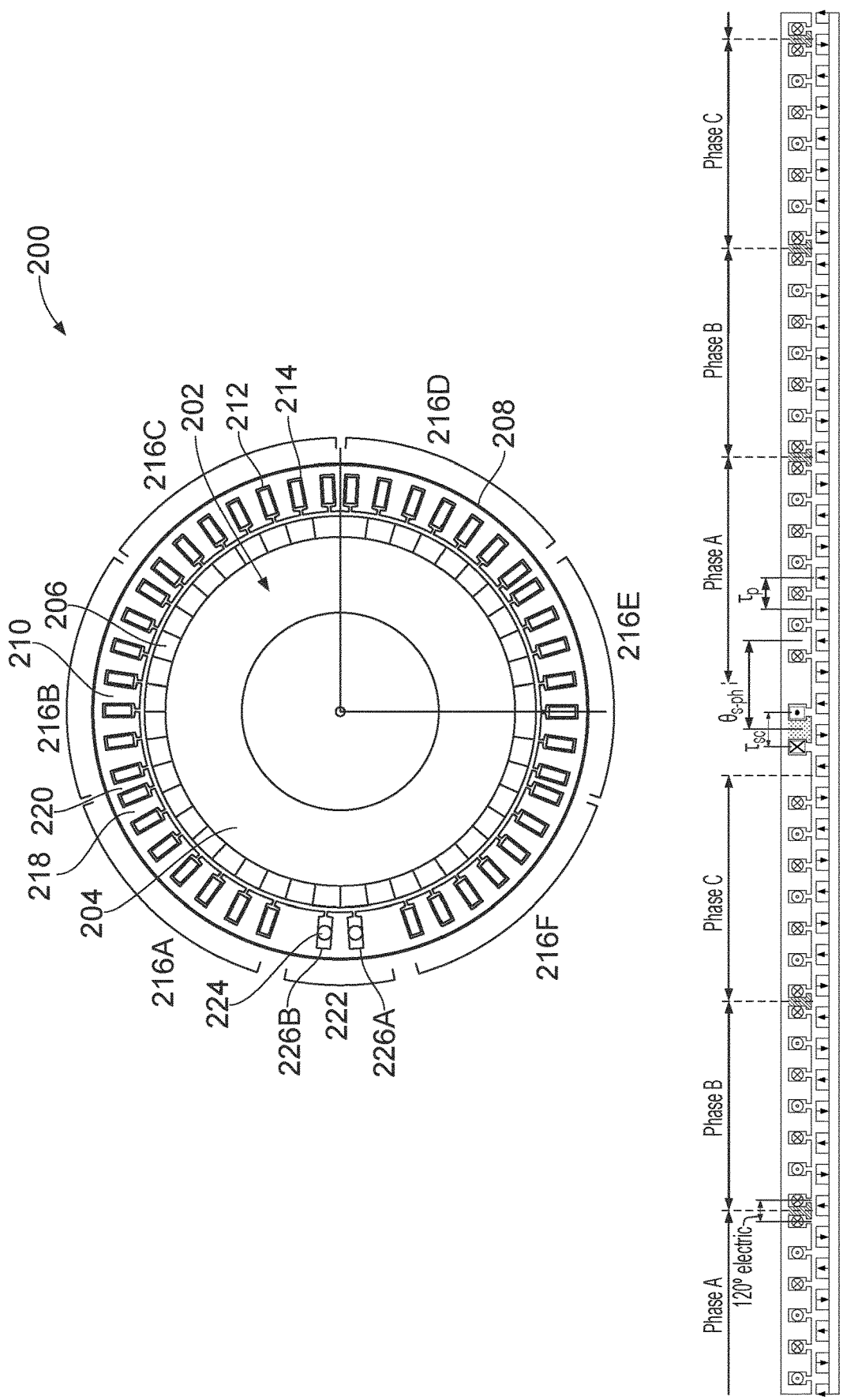
FIG. 10 is a further diagram illustrating an electrical machine according to the present invention.

A first example is provided by FIG. 10, which shows an electrical machine 200, where n=6, $N_s$=42, and 2p=44. As before, the electrical machine 200 comprises a rotor 202 and a stator 208. The rotor 202 comprises a rotating component 204, preferably in the form of a ferromagnetic back iron, the rotating component 204 being surrounded by an array of permanent magnets 206 distributed around its circumference. As noted above, the electrical machine 200 of FIG. 10 has 44 permanent magnets 206.

The stator 208 comprises a magnetic stator core 210, and plurality of longitudinal slots 212 distributed evenly around the circumference of the stator 208 and that extend through the stator core 210 in the direction of the longitudinal axis. As noted above, the stator 208 comprises 42 slots 212. The stator 208 further comprises a plurality of concentrated windings for each of the three phases (denoted A, B and C), as further shown in the winding layout 228 of FIG. 10. For each phase, the windings are grouped such that a plurality of conductors 214 are wound around the slots 212 to form two elementary blocks 216A-216F of concentrated windings, with each slot 212 being configured to receive a conductor 214. In this example, the conductors 214 for phase A are wound around the slots 212 in the blocks denoted 216A and 216D, the conductors 214 for phase B are wound around the slots 212 in the blocks denoted 216B and 216E, and the conductors 214 for phase C are wound around the slots 212 in the blocks denoted 216C and 216F.

Within each elementary block 216A-216F, the slots 212 are separated by a plurality of stator teeth 218 of a first size, such that the slot pitch, $\tau_s$, that is, the angle between adjacent slots 212, is equal to the rotor pole pitch, $\tau_p$. In this example, the elementary blocks 216A-216F are mechanically shifted together to create a space in which a single position sensor 222 can be placed. In this example, small stator teeth 220 are provided between elementary blocks 216A and 216B, 216B and 216C, 216C and 216D, 216D and 216E, and 216E and 216F respectively, with the position sensor 222 being located between elementary blocks 216A and 216F. As before, the position sensor 222 comprises a sensor coil 224 wound around a pair of slots 226A-B.

Figure 11:
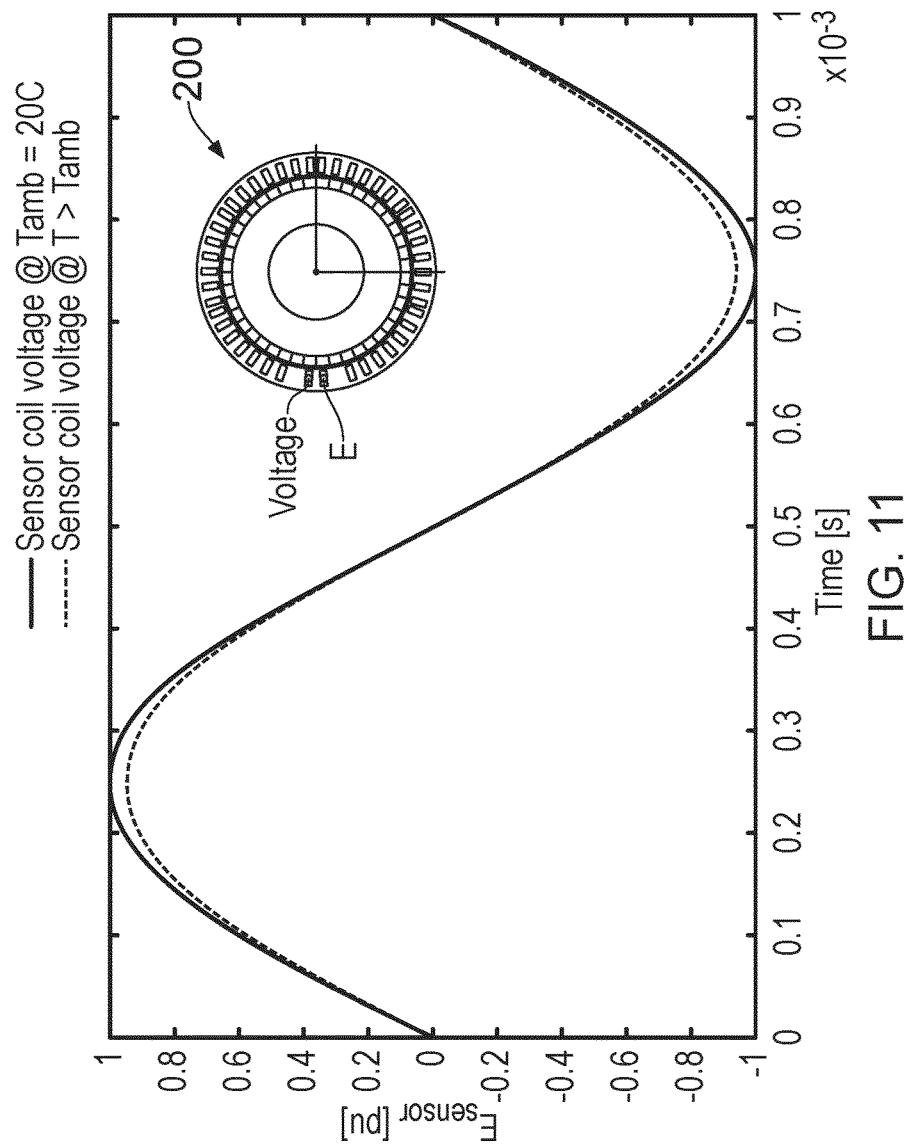
FIG. 11 is a further graph illustrating an output of an electrical machine according to the present invention.

FIG. 11 further illustrates the temperature dependence of the back EMF of the sensor coil, as measured using the position sensor 222 of FIG. 10. FIG. 11 shows the voltage of the sensor coil 224 at ambient temperature (T=20° C.), and the voltage of the sensor coil 224 at a temperature above 20° C. Here it can be seen that the back EMF of the sensor coil 224 drops as the temperature increases.

Figure 12:
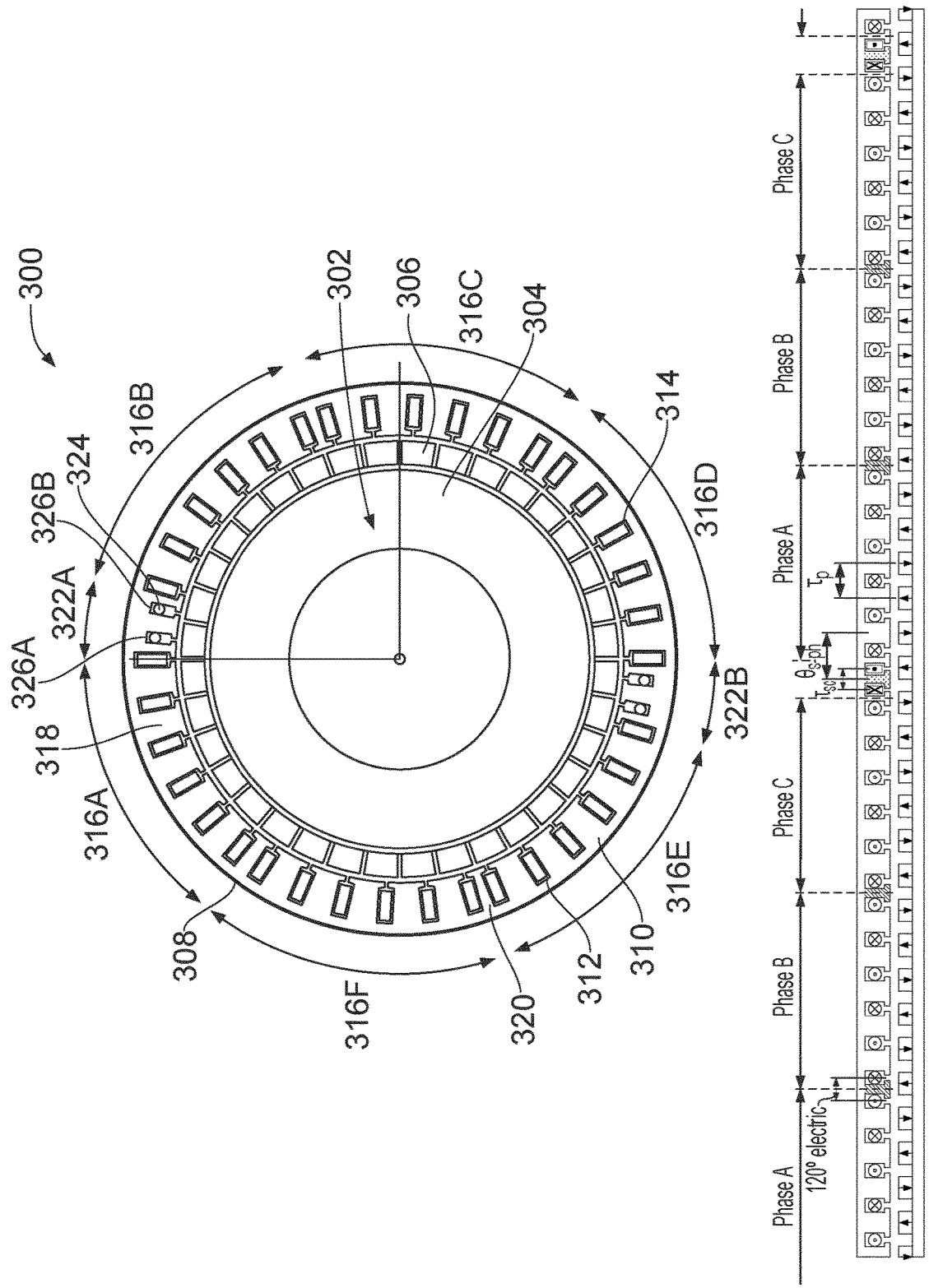
FIG. 12 is a further diagram illustrating an electrical machine according to the present invention.
Figure 13:
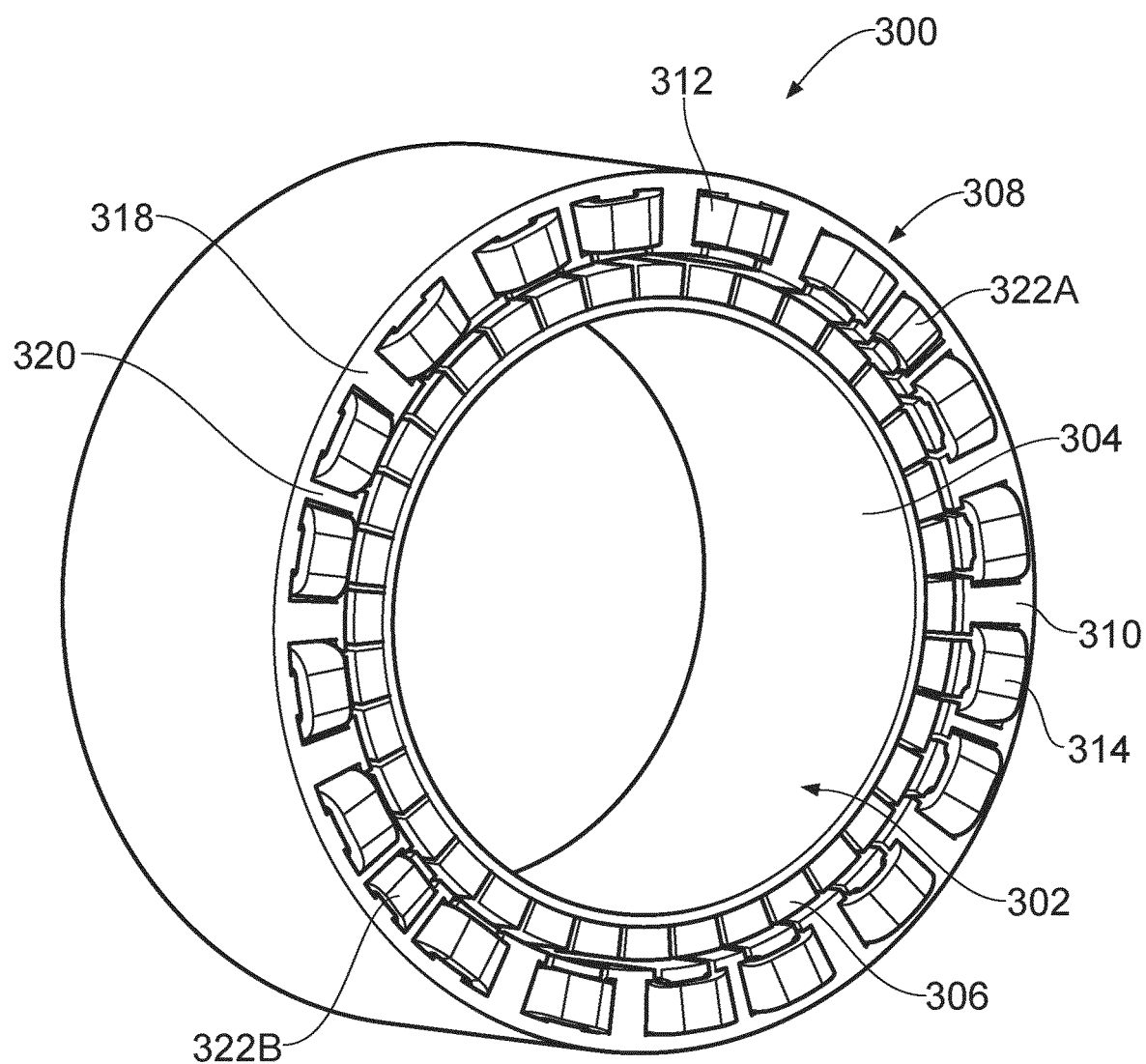
FIG. 13 is a further diagram illustrating an electrical machine according to the present invention.

A further example of a feasible electrical machine is provided by FIGS. 12 and 13, which show an electrical machine 300, where n=6, $N_s$=36, and 2p=36. As before, the electrical machine 300 comprises a rotor 302 and a stator 308. The rotor 302 comprises a rotating component 304, preferably in the form of a ferromagnetic back iron, the rotating component 304 being surrounded by an array of permanent magnets 306 distributed around its circumference. As noted above, the electrical machine 300 of FIGS. 12 and 13 has 36 permanent magnets 306.

The stator 308 comprises a magnetic stator core 310, and plurality of longitudinal slots 312 distributed evenly around the circumference of the stator 308 and that extend through the stator core 310 in the direction of the longitudinal axis. As noted above, the stator 308 comprises 36 slots 312. The stator 308 further comprises a plurality of concentrated windings for each of the three phases (denoted A, B and C), as further shown in the winding layout 328 of FIG. 12. For each phase, the windings are grouped such that a plurality of conductors 314 are wound around the slots 312 to form two elementary blocks 316A-316F of concentrated windings, with each slot 312 being configured to receive a conductor 314. In this example, the conductors 314 for phase A are wound around the slots 312 in the blocks denoted 316A and 316D, the conductors 314 for phase B are wound around the slots 312 in the blocks denoted 316B and 316E, and the conductors 314 for phase C are wound around the slots 312 in the blocks denoted 316C and 316F.

Within each elementary block 316A-316F, the slots 312 are separated by a plurality of stator teeth 318 of a first size, such that the slot pitch, $\tau_s$, that is, the angle between adjacent slots 312, is equal to the rotor pole pitch, $\tau_p$. In this example, the elementary blocks 316A-316F are mechanically shifted together to create two spaces in which a position sensor 322A-322B can be placed. In this example, small stator teeth 320 are provided between elementary blocks 316B and 316C, 316C and 316D, 316E and 316F, and 316F and 316A respectively, with the first position sensor 222A being located between elementary blocks 316A and 316B and the second position sensor 222B being located between elementary blocks 316D and 316E. As before, the position sensors 322A, 322B each comprise a sensor coil 324 wound around a pair of slots 326A-B.

Figure 14:
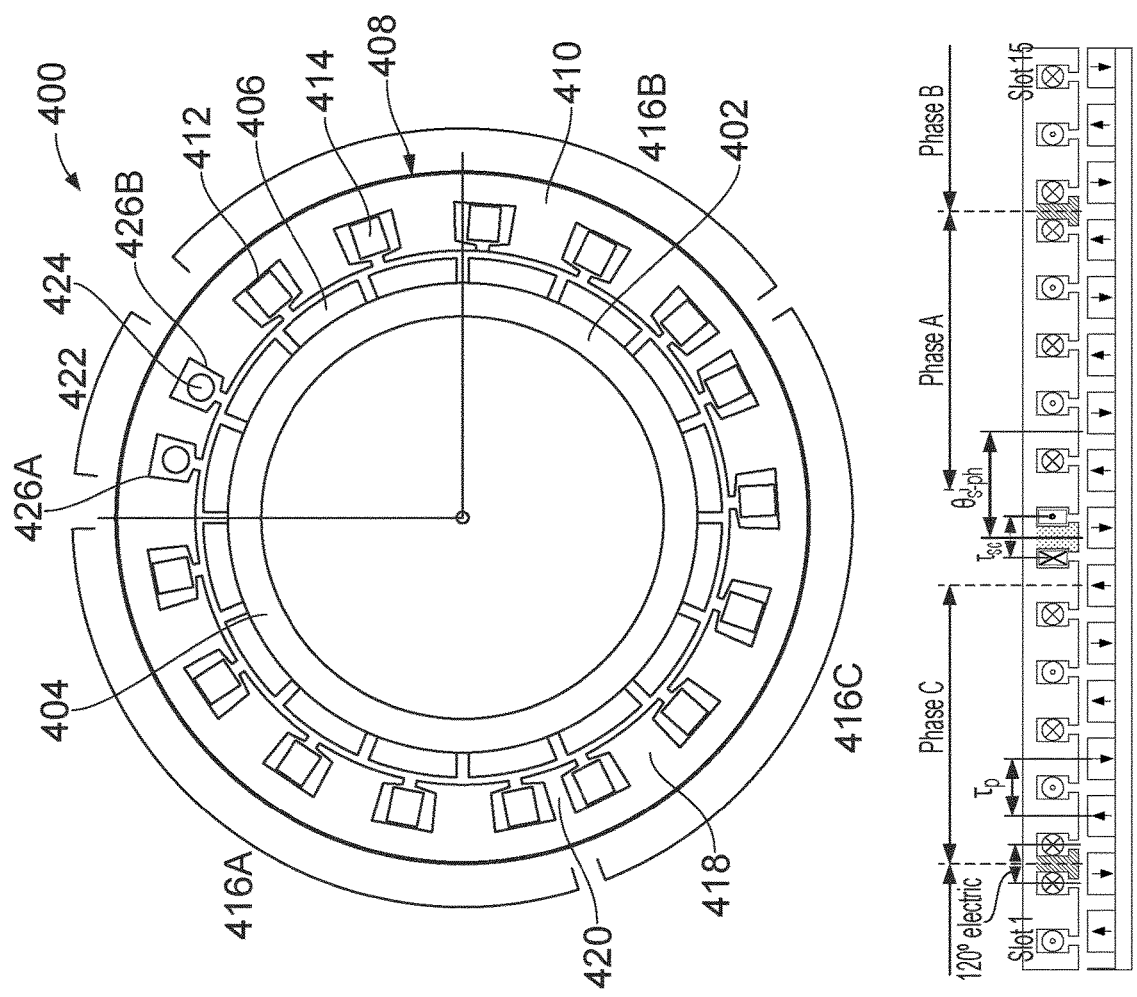
FIG. 14 is a further diagram illustrating an electrical machine according to the present invention.

FIG. 14 provides an example of an electrical machine 400 where n=3, $N_s$=15, and 2p=16. As before, the electrical machine 400 comprises a rotor 402 and a stator 408. The rotor 402 comprises a rotating component 404, preferably in the form of a ferromagnetic back iron, the rotating component 404 being surrounded by an array of permanent magnets 406 distributed around its circumference. As noted above, the electrical machine 400 of FIG. 14 has 16 permanent magnets 406.

The stator 408 comprises a magnetic stator core 410, and plurality of longitudinal slots 412 distributed evenly around the circumference of the stator 408 and that extend through the stator core 410 in the direction of the longitudinal axis. As noted above, the stator 108 comprises 15 slots 412. The stator 408 further comprises a plurality of concentrated windings for each of the three phases (denoted A, B and C), as further shown in the winding layout 428 of FIG. 14. For each phase, the windings are grouped such that a plurality of conductors 414 are wound around the slots 412 to form a single elementary block 416A-416C of concentrated windings, with each slot 412 being configured to receive a conductor 414. In this example, the conductors 414 for phase A are wound around the slots 412 in the elementary block denoted 416A, the conductors 414 for phase B are wound around the slots 412 in the elementary block denoted 416B, and the conductors 414 for phase C are wound around the slots 412 in the elementary block denoted 416C.

Within each elementary block 416A-416C, the slots 412 are separated by a plurality of stator teeth 418 of a first size, such that the slot pitch, $\tau_s$, that is, the angle between adjacent slots 412, is equal to the rotor pole pitch, $\tau_p$. In this example, the elementary blocks 416A-416C are mechanically shifted together to create a space in which a single position sensor 422 can be placed. In this example, small stator teeth 420 are provided between elementary blocks 416A and 416C, and 416B and 416C respectively, with the position sensor 422 being located between elementary blocks 416A and 416b. As before, the position sensor 422 comprises a sensor coil 424 wound around a pair of slots 426A-B.

Figure 15:
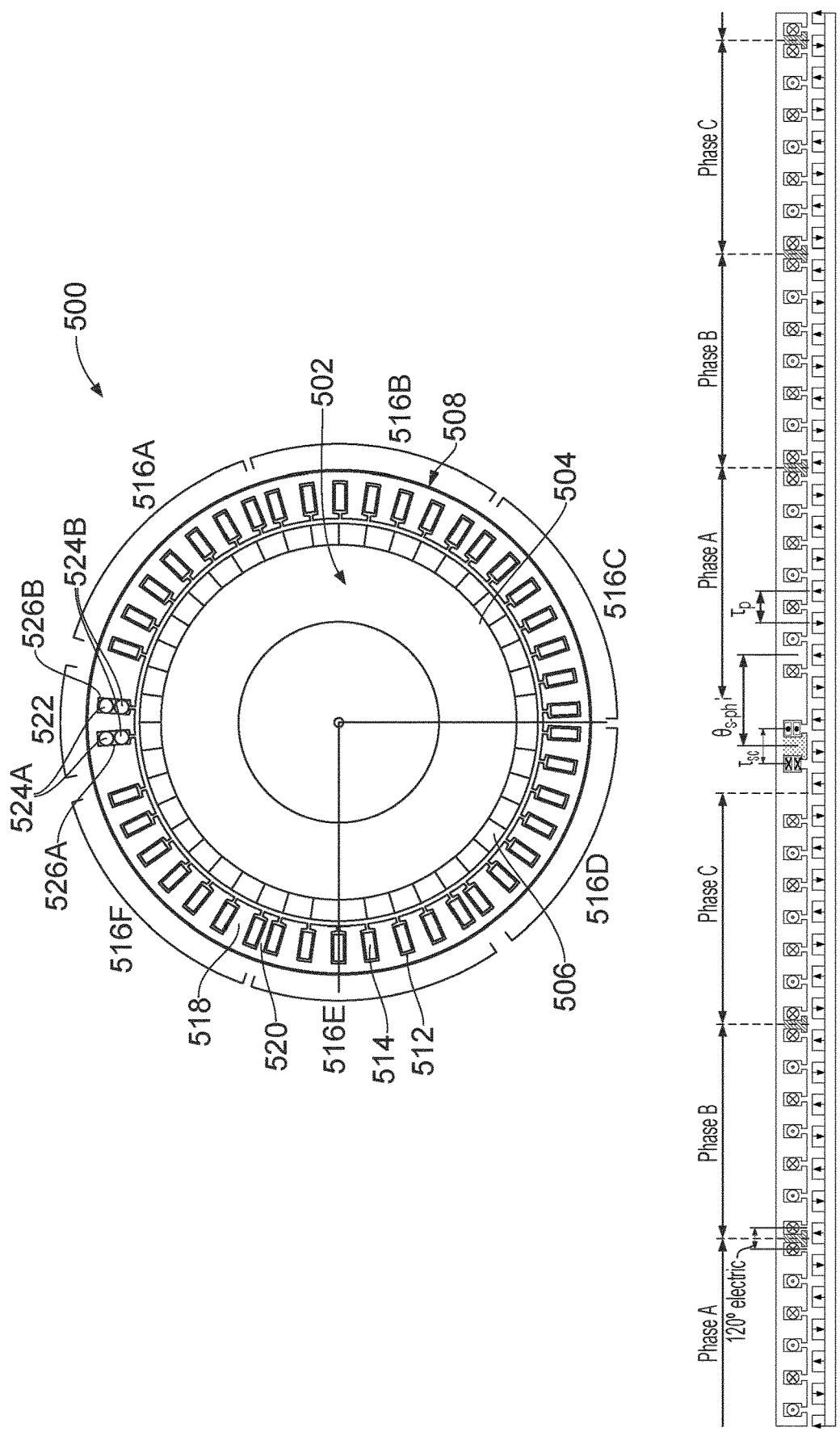
FIG. 15 is a further diagram illustrating an electrical machine according to the present invention.

FIG. 15 shows a further example of an electrical machine 500 according to the present invention, where n=6, $N_s$=42, and 2p=44. As before, the electrical machine 500 comprises a rotor 502 and a stator 508. The rotor 502 comprises a rotating component 504, preferably in the form of a ferromagnetic back iron, the rotating component 504 being surrounded by an array of permanent magnets 506 distributed around its circumference. As noted above, the electrical machine 500 of FIG. 15 has 44 permanent magnets 506.

The stator 508 comprises a magnetic stator core 510, and plurality of longitudinal slots 512 distributed evenly around the circumference of the stator 508 and that extend through the stator core 510 in the direction of the longitudinal axis. As noted above, the stator 508 comprises 42 slots 512. The stator 508 further comprises a plurality of concentrated windings for each of the three phases (denoted A, B and C), as further shown in the winding layout 528 of FIG. 15. For each phase, the windings are grouped such that a plurality of conductors 514 are wound around the slots 512 to form two elementary blocks 516A-516F of concentrated windings, with each slot 512 being configured to receive a conductor 514. In this example, the conductors 514 for phase A are wound around the slots 512 in the blocks denoted 516A and 516D, the conductors 514 for phase B are wound around the slots 512 in the blocks denoted 516B and 516E, and the conductors 514 for phase C are wound around the slots 512 in the blocks denoted 516C and 516F.

Within each elementary block 516A-516F, the slots 512 are separated by a plurality of stator teeth 518 of a first size, such that the slot pitch, $\tau_s$, that is, the angle between adjacent slots 512, is equal to the rotor pole pitch, $\tau_p$. In this example, the elementary blocks 516A-516F are mechanically shifted together to create a single space in which a position sensor 522 can be placed. As such, small stator teeth 520 are provided between elementary blocks 516A and 516B, 516B and 516C, 516C and 516D, 516D and 516E, and 516E and 516F respectively, with the position sensor 522 being located between elementary blocks 516A and 516F. However, in this case, the position sensor 522 comprises two sensor coils 524A-524B wound around a pair of slots 526A-B. Each sensor coil 524A, 524B will be separately connected as to effectively provide two position sensors. That is to say, the position sensor 522 will output two separate voltage measurements. As discussed previously, this is advantageous in providing fault tolerant control of the electrical machine 500.

Figure 16:
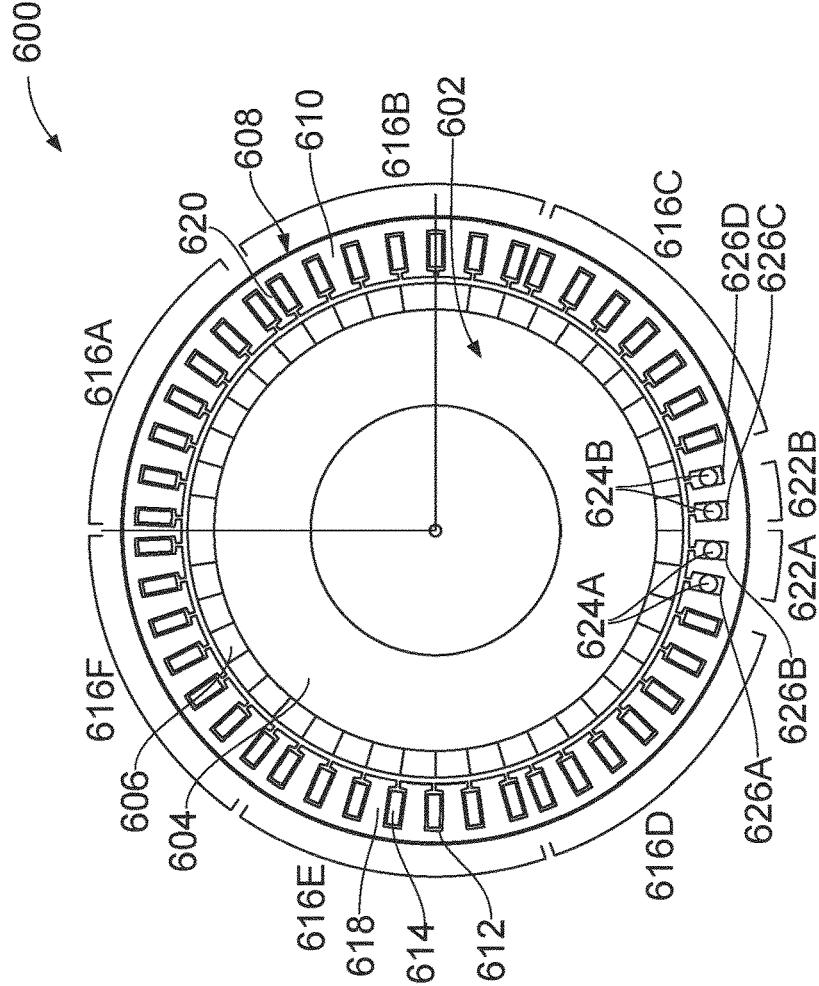
FIG. 16 is a further diagram illustrating an electrical machine according to the present invention.
Figure 16:
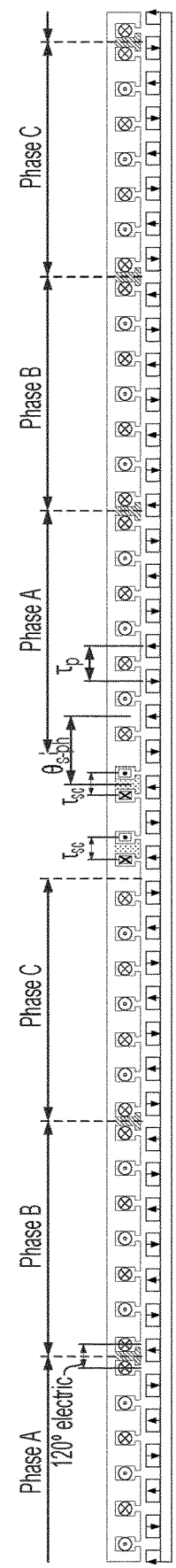

FIG. 16 shows a further example of an electrical machine 600 according to the present invention, where n=6, $N_s$=42, and 2p=44. As before, the electrical machine 600 comprises a rotor 602 and a stator 608. The rotor 602 comprises a rotating component 604, preferably in the form of a ferromagnetic back iron, the rotating component 604 being surrounded by an array of permanent magnets 606 distributed around its circumference. As noted above, the electrical machine 600 of FIG. 16 has 44 permanent magnets 606.

The stator 608 comprises a magnetic stator core 610, and plurality of longitudinal slots 612 distributed evenly around the circumference of the stator 608 and that extend through the stator core 610 in the direction of the longitudinal axis. As noted above, the stator 608 comprises 42 slots 612. The stator 608 further comprises a plurality of concentrated windings for each of the three phases (denoted A, B and C), as further shown in the winding layout 628 of FIG. 16. For each phase, the windings are grouped such that a plurality of conductors 614 are wound around the slots 612 to form two elementary blocks 616A-616F of concentrated windings, with each slot 612 being configured to receive a conductor 614. In this example, the conductors 614 for phase A are wound around the slots 612 in the blocks denoted 616A and 616D, the conductors 614 for phase B are wound around the slots 612 in the blocks denoted 616B and 616E, and the conductors 614 for phase C are wound around the slots 612 in the blocks denoted 616C and 616F.

Within each elementary block 616A-616F, the slots 612 are separated by a plurality of stator teeth 618 of a first size, such that the slot pitch, $\tau_s$, that is, the angle between adjacent slots 612, is equal to the rotor pole pitch, $\tau_p$. In this example, the elementary blocks 616A-616F are mechanically shifted together to create a single space in which two position sensors 622A-622B can be placed. As such, small stator teeth 620 are provided between elementary blocks 616A and 616B, 616B and 616C, 616D and 616E, 516E and 616F, and 616F and 616A respectively, with the position sensors 622A, 622B being located in series between elementary blocks 616C and 616D. As before, each position sensor 622A, 622B comprises a sensor coil 624 wound around a pair of slots 626A-B. As discussed previously, this is advantageous in providing fault tolerant control of the electrical machine 500.

Figure 17:
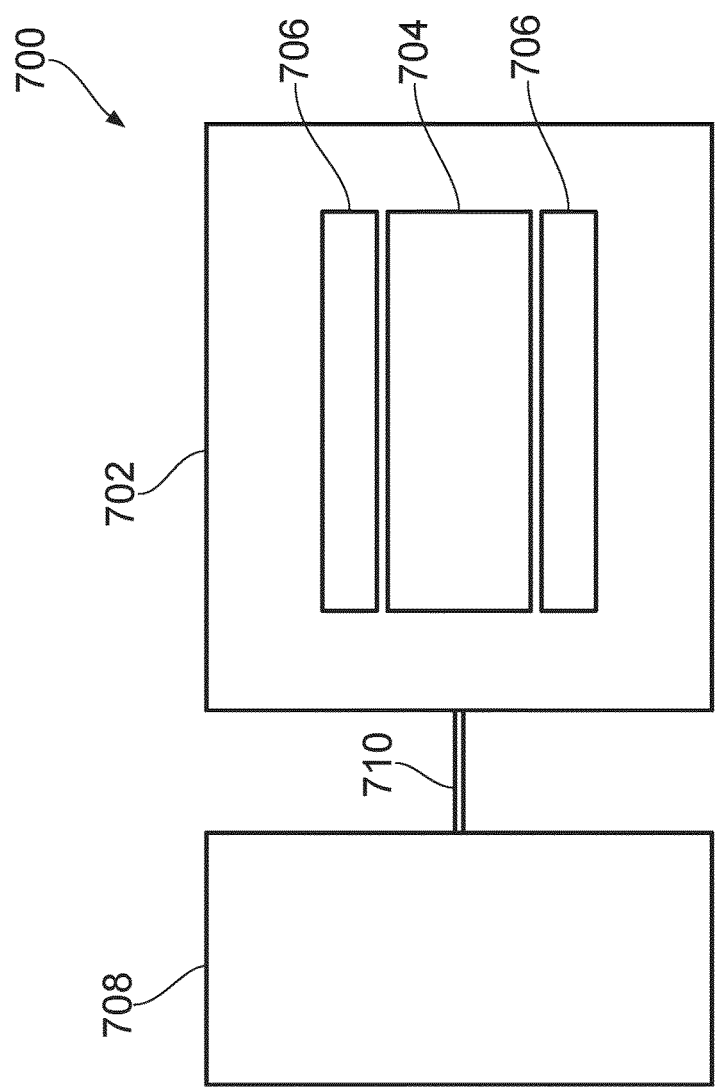
FIG. 17 is a schematic of an aircraft propulsion system comprising an electrical machine according to the present invention.

FIG. 17 illustrates an example of a full-electric or hybrid-electric aircraft propulsion system 700 comprising an electrical machine 702 as described herein. The electrical machine 702 comprises a rotor 704 and a stator 706 according to the arrangements described above. In this respect, the stator 706 is configured so that the coils corresponding to each phase are arranged into elementary blocks are positioned so as to allow a position sensor coil to be integrated to the stator core. The electrical machine 702 is connected to an aircraft propeller 708 by means of a rotating shaft 710, wherein the electric motor 702 drives the shaft 710 to thereby drive the propeller 708.

In the context of a full electric or hybrid-electric aircraft, the electrical machine described herein may be used in a propulsive system, wherein the electric motors driving the propellers of the aircraft by converting the electrical power, supplied by electrical generators driven by a turboshaft or given by the battery, to a mechanical power (torque).

Various modifications, whether by way of addition, deletion and/or substitution, may be made to all of the above described embodiments to provide further embodiments, any and/or all of which are intended to be encompassed by the appended claims.

The invention claimed is:

1. An electrical machine for use in an aircraft, comprising:
a rotor that includes a plurality of rotor poles; and
a stator that includes a plurality of phases, wherein each respective phase of the plurality of phases occupies at least one elementary block, the at least one elementary block of each phase comprising a set of conductors of the respective phase wound around a plurality of slots of the respective elementary block in a concentrated winding configuration;
wherein the stator further comprises at least one sensor located between two elementary blocks, the at least one sensor being configured to measure at least one parameter of the rotor, and wherein the at least one sensor comprises at least one sensor coil wound around a pair of adjacent slots.

2. The electrical machine according to claim 1, wherein the at least one sensor is configured to measure an angular position of the rotor.

3. The electrical machine according to claim 1, wherein the at least one sensor is configured to measure a temperature of the rotor.

4. The electrical machine according to claim 1, further comprising at least one power electronics module for treating the electrical output of the concentrated windings, wherein the at least one power electronics module is electrically connected to conductors of at least one phase of the plurality of phases, and wherein the at least one sensor coil is electrically connected to the power electronics module of the electrical machine.

5. The electrical machine according to claim 1, wherein the at least one sensor coil is arranged to measure an angular position of the rotor based on a voltage induced therein.

6. The electrical machine according to claim 1, wherein the at least one sensor coil is arranged to measure a temperature of the rotor based on a voltage induced therein.

7. The electrical machine according claim 1, wherein a first mechanical shift angle between the sensor coil and an adjacent elementary block is greater than a rotor pole pitch, the rotor pole pitch being an angle between adjacent poles of the rotor.

8. The electrical machine according to claim 7, wherein a second mechanical shift angle between the respective concentrated windings of each pair of adjacent elementary blocks is less than the rotor pole pitch.

9. The electrical machine according to claim 8, wherein the second mechanical shift angle is about two thirds of the rotor pole pitch.

10. The electrical machine according to claim 1, wherein the stator comprises two sensors.

11. The electrical machine according to claim 10, wherein each of the two sensors comprises a sensor coil wound around a pair of adjacent slots.

12. The electrical machine according to claim 10, wherein the two sensors comprise a first sensor at a first position on the stator and a second sensor at a second position on the stator.

13. The electrical machine according to claim 12, wherein the first and second positions are diametrically opposed.

14. The electrical machine according to claim 12, wherein the first position is adjacent to the second position.

15. The electrical machine according to claim 10, wherein the two sensors comprise a first sensor coil and a second sensor coil, the first and second sensor coils being wound around a mutual pair of adjacent slots.

16. The electrical machine according to claim 1, wherein the rotor comprises a plurality of permanent magnets.

17. The electrical machine according to claim 1, wherein each phase comprises two elementary blocks being connected by a single end conductor.

18. The electrical machine according to claim 1, wherein the stator comprises three phases.

19. An aircraft propulsion system comprising the electrical machine according to claim 1.

* * * * *